Figure 1:
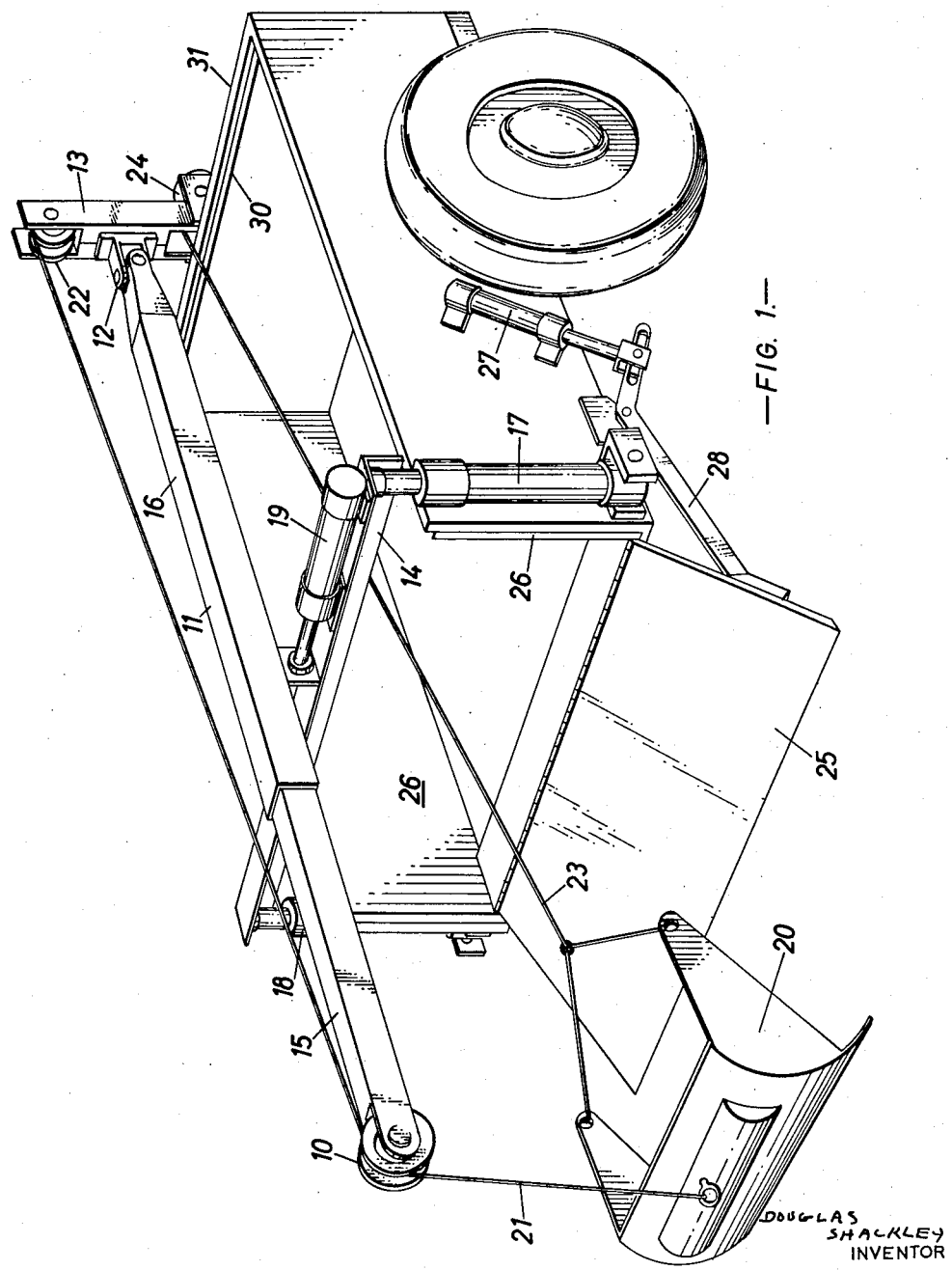

Dec. 24, 1963　　　　　D. SHACKLEY　　　　　3,115,258
LOADING AND TRANSPORT OF MINERALS IN MINES AND QUARRIES
Filed May 6, 1960　　　　　　　　　　　　6 Sheets-Sheet 2

DOUGLAS SHACKLEY INVENTOR

BY Mead, Browne,
Schuyler & Beveridge
ATTORNEYS

Dec. 24, 1963   D. SHACKLEY   3,115,258
LOADING AND TRANSPORT OF MINERALS IN MINES AND QUARRIES
Filed May 6, 1960   6 Sheets-Sheet 4
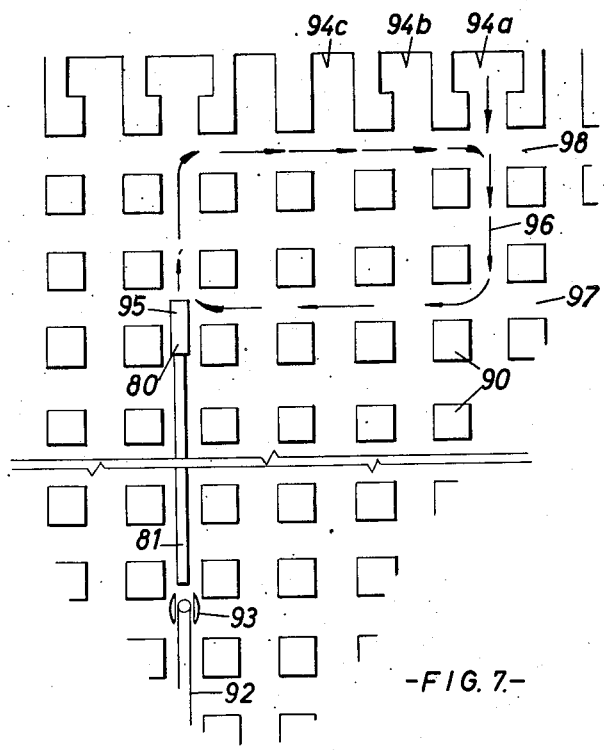
-FIG. 7.-
DOUGLAS SHACKLEY INVENTOR
BY Mead, Browne,
Schuyler & Beveridge
ATTORNEYS

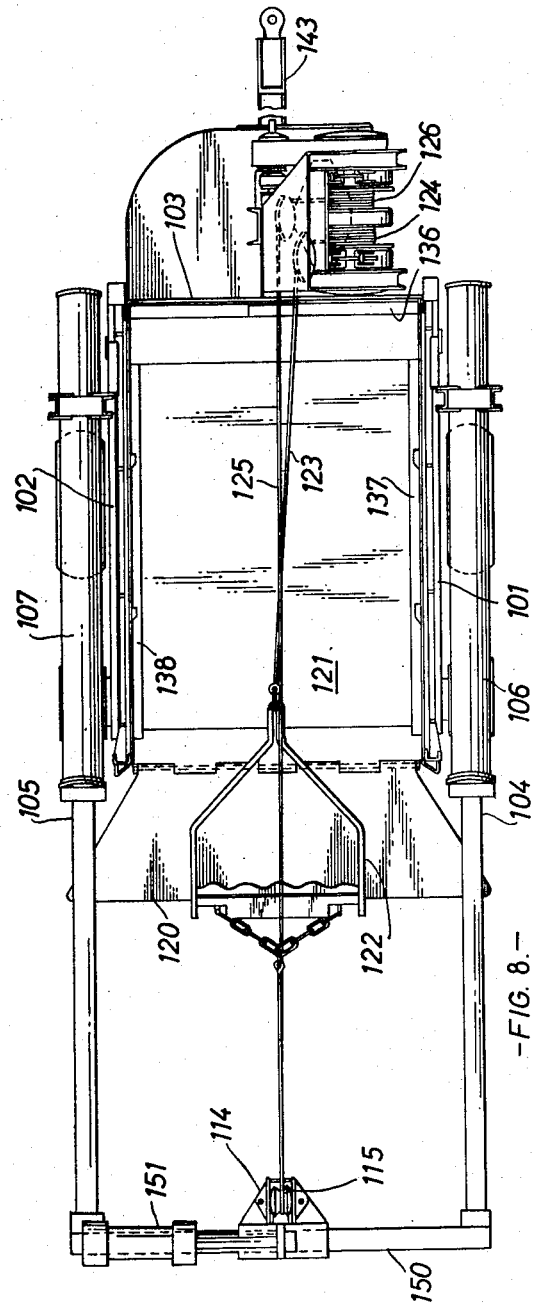

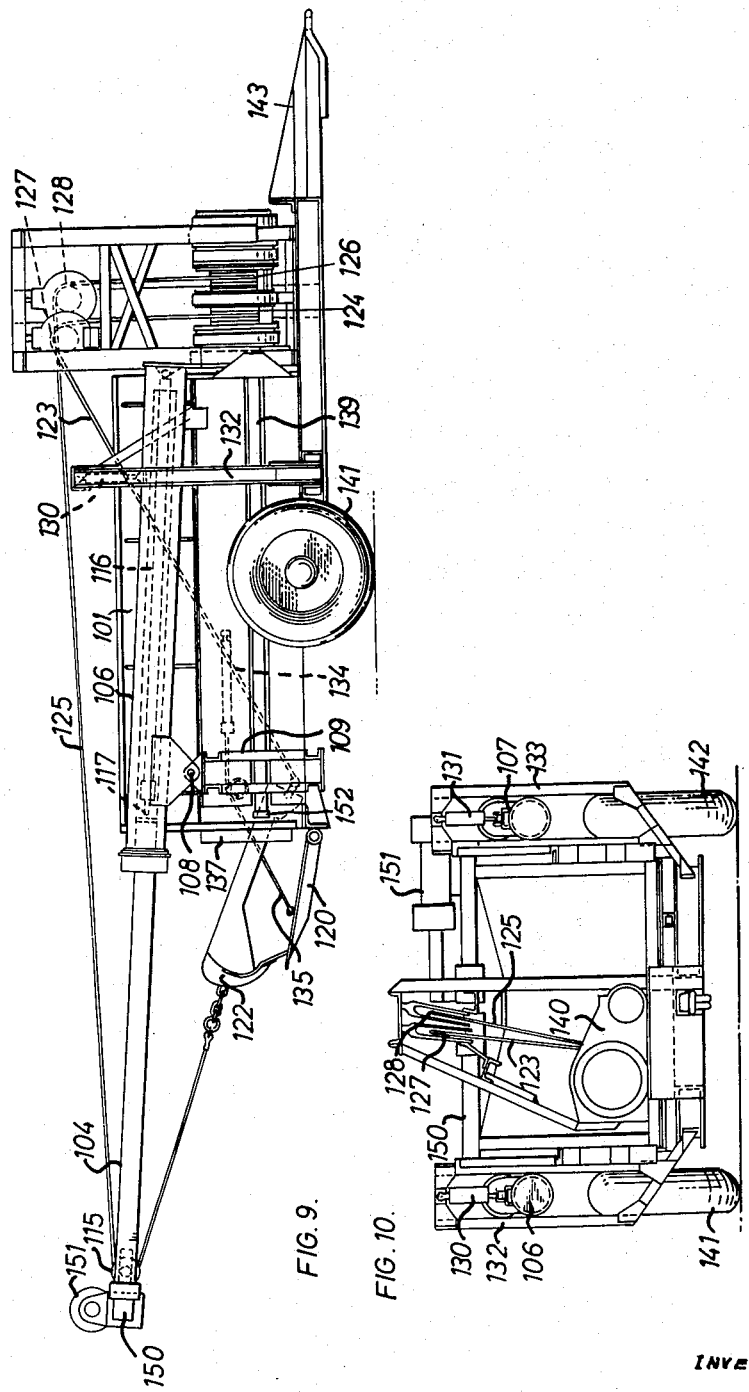

United States Patent Office 3,115,258
Patented Dec. 24, 1963

---

3,115,258
LOADING AND TRANSPORT OF MINERALS IN MINES AND QUARRIES
Douglas Shackley, Penrith, Cumberland, England, assignor to The Long Meg Plaster & Mineral Co. Limited, Cocklakes, near Carlisle, England
Filed May 6, 1960, Ser. No. 27,326
Claims priority, application Great Britain May 9, 1959
15 Claims. (Cl. 214—82)

The present invention relates to loading and transport of minerals in mines and quarries either surface or underground.

The present invention is concerned with the problem of transferring minerals from the face to the permanent conveyor system of the mine or quarry. The term "permanent conveyor system" as used herein is defined as a conveyor system which is intended to remain fixed in position so long as that section or district of the mine which the system serves is in operation. The permanent conveyor system may comprise for example a conveyor some hundreds of yards in length in series with a longer tramway and the problem of the present invention resides in the transfer and loading of the mined mineral onto the adjacent end of the conveyor. In some mines, for example gypsum and anhydrite mines, this is done by means of transverse conveyors leading to the end of the permanent conveyor and a series of rope supported skip conveyors leading from the face to one or other of the transverse conveyors, the skips of the skip conveyor system being self-loading in that they are dragged through the rock pile.

A disadvantage of this system is that it is inflexible in the event of geological disturbances or zones of inferior mineral, making an alteration in layout desirable. Furthermore the equipment needs to be extended and resited at regular intervals as the mining proceeds.

In another system trailer vehicles drawn by tractors are loaded by relatively expensive loading machines of which a number of types are available.

The object of the present invention is to provide a less expensive yet flexible system of transferring and loading rock from the vicinity of the face onto the permanent conveyor system.

The present invention resides in a wheeled vehicle provided with a rearwardly extending boom which supports the tail pulley of a drag line loader having a skip for drawing the load up a tailboard provided at the rear of the vehicle.

The vehicle may be a tractor-drawn trailer vehicle and the winch gear for operating the drag line loader may be mounted on the forward end of the trailer and driven mechanically or hydraulically from a power take-off from the tractor or from a hydraulic system of the tractor.

The boom may be extensible and in one embodiment is supported at the rear of the vehicle by a cross-beam and means may be provided for traversing the boom along the cross-beam to enable rock to be loaded from different areas of the face for a given position of the vehicle. The elevation of the beam may be adjusted by any suitable means such as hydraulic rams to enable the tail pulley to be adjusted in height.

In another embodiment of the invention the rear end of the boom is pivoted to a forward corner of the vehicle and is supported from the rear end of the vehicle by a strut which extends transversely obliquely from one side of the vehicle at its rear end. The strut may include a hydraulic piston and cylinder for raising and lowering the boom. Due to the oblique disposition of the strut in this embodiment raising and lowering of the boom also effects simultaneous transverse traversing of the boom.

While the invention may most economically be carried into effect with a trailer vehicle drawn by a tractor, it can also be applied to self-propelled vehicles. In the case of a mine face from 150 to 200 yards in width it is envisaged that six or seven vehicles according to the present invention may be used in conjunction with a single permanent conveyor system each vehicle operating on a given section of the face.

A preferred form of tractor or self-propelled vehicle for use in the present invention is one which can be unloaded without tipping such for example as a vehicle with a longitudinally traversible transverse wall which during loading is located at the forward end and can be traversed towards the rearward end for unloading.

Figure 2:
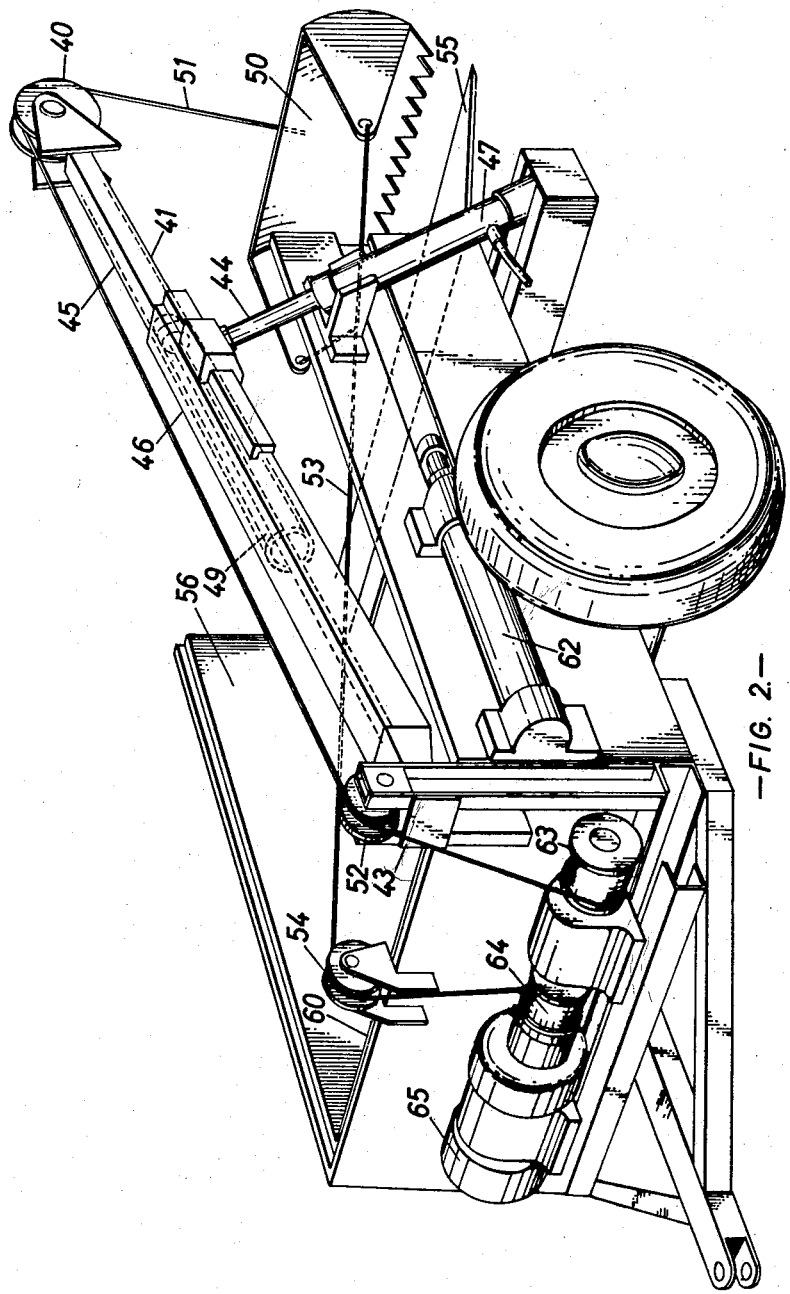
Figure 3:
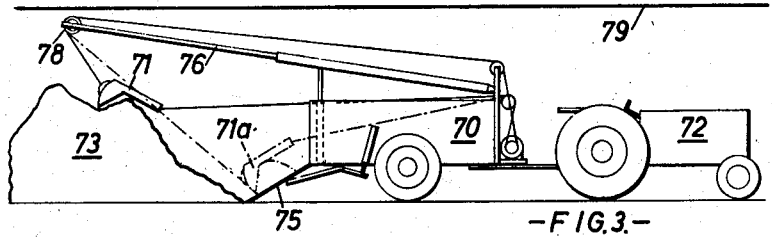
Figure 4:
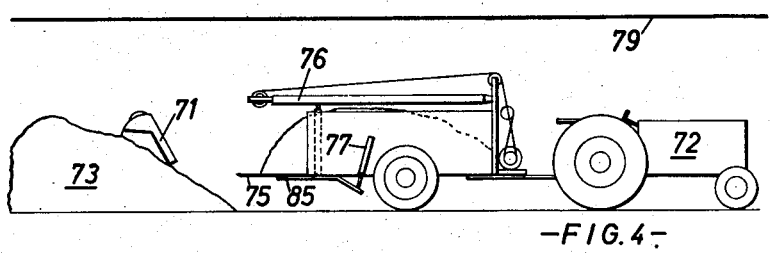
Figure 5:
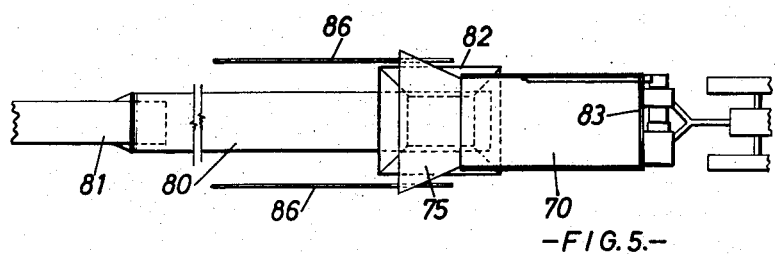
Figure 6:
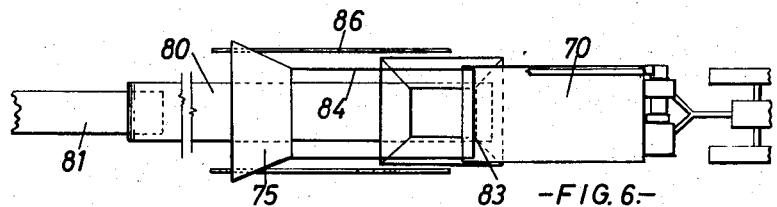

The invention is further described by way of example with reference to the accompanying drawings in which:

FIG. 1 is a perspective view from the rear end of a vehicle according to one embodiment of the invention, FIG. 2 is a perspective view from the front end of a vehicle according to another embodiment of the invention, FIGS. 3 and 4 are diagrammatic side views illustrating the method of loading a vehicle according to the invention, FIGS. 5 and 6 are diagrammatic plan views illustrating a method of unloading a vehicle of the present invention, FIG. 7 is a diagrammatic plan view of part of an anhydrite or gypsum mine serving to illustrate the method in which a vehicle according to the present invention is used to load a conveyor system of the mine, FIG. 8 is a plan view of a further embodiment of a trailer vehicle according to the invention, and FIGS. 9 and 10 are a side elevation and a front elevation respectively of the vehicle of FIG. 8.

The vehicles illustrated in FIGS. 1 and 2 are trailer vehicles and are intended to be tractor drawn. The power required to operate the drag line loader is preferably obtained from a power take-off of the tractor and/or a hydraulic system of the tractor.

In the embodiment of the invention in FIG. 1, a tail pulley 10 of a drag line loader is supported from a rearwardly extending boom 11 which is pivoted, for example, by a universal joint 12, to a column 13 extending upwardly at the forward end of a trailer vehicle. The boom 11 is also supported by means of a cross-beam 14 at the rear of the vehicle.

The boom 11 is formed of two portions 15 and 16 which are telescopic. The rearwardly extending portion 15 can be extended, for example, by means of a hydraulic piston and cylinder mechanism (not shown), within the portion 16. The elevation of the pulley 10 may be adjusted by means of hydraulic piston and cylinder devices 17 and 18 which serve to raise and lower the cross-beam 14. If desired, the boom 11 may also be traversed along the cross-beam 14 transversely of the vehicle by means of a hydraulic piston and cylinder device 19. A skip 20 of the drag line loader is operated by a cable 21 passing over the tail pulley 10 and a pulley 22 and cable 23 passing over a pulley 24. A tail board 25 is hinged to a pair of inner side walls 26 of the vehicle, the tail board being of sufficient size to form a suitable ramp up which material being loaded can be dragged by means of the drag line loader, when the tail board is resting on the ground. To enable the vehicle to be moved from one place to another the tail board can be raised by means of a hydraulic piston and cylinder device 27 which operates a lever 28 acting on the lower side of the tail board.

The winches for winding cables 21 and 23 are at the forward end of the vehicle and are not shown in FIG. 1. They are, however, similar to winches which are hereinafter described with reference to and illustrated in FIG. 2.

The vehicle of FIG. 1 has a longitudinally traversible transverse wall 30 which is shown in FIG. 1 in its forward position. In its forward position the inner wall 30 lies adjacent the outer transverse wall 31. The inner wall 30 is attached to the inner side walls 26 and the complete assembly comprising the transverse wall 30 and the side walls 26 together with the tail board 25 can be rearwardly traversed with respect to the vehicle body. Further hydraulic piston and cylinder mechanisms (not shown) may be utilized for effecting the traverse of this assembly to unload the vehicle.

In the embodiment of FIG. 2 a tail pulley 40 of a drag line loader is attached to a rearwardly extending boom 41 comprising telescopic portions 45 and 46 and pivoted to a column 43 upwardly extending from a forward corner of the vehicle. A hydraulic piston and cylinder mechanism for adjusting the rearward extent of the boom 41 is indicated at 49 in dotted lines inside the boom portion 46. The boom 41 is supported from the rear of the vehicle by means of an obliquely disposed strut 44. The strut 44 includes a hydraulic piston and cylinder mechanism 7 for raising and lowering the tail pulley 40. Due to the oblique disposition of the strut 44, raising and lowering of the pulley 40 effects simultaneous traversing of the pulley.

A skip 50 of the drag line loader is operated by means of a cable 51 passing over the tail pulley 40 and a pulley 52 and a cable 53 passing over a pulley 54 disposed approximately centrally at the forward end of the vehicle.

As in the embodiment of FIG. 1 a tail board 55 is hinged to inner side walls 56 which are attached to a traversible inner transverse wall 60. Forward and rearward traversing of the transverse wall 60 and of the inner side walls 56 may be effected by means of hydraulic piston and cylinder devices 62 which are indicated somewhat diagrammatically in FIG. 2. In practice it may be necessary for piston and cylinder devices 62 and also the device 49 to comprise several telescopable cylinders in order to obtain a sufficient effective length of stroke.

Winches 63 and 64, upon which the cables 51 and 53 may be wound, are disposed at the forward end of the vehicle and may be separately actuated (or braked) by means of levers (not shown) from a hydraulic motor 65 or preferably directly through a reduction gear from a power take-off of a tractor.

The method of loading a vehicle according to the invention is illustrated in FIG. 3. FIG. 3 shows a trailer vehicle 70 according to the invention which is towed by a tractor 72. A skip 71 is shown as it is being dragged through a pile 73 of material which has previously been blasted from the working face of a mine. A skip loaded with material is dragged up the tail board 75 as indicated at 71a in broken lines and into the trailer vehicle 70. The operation is continued in the conventional manner until the trailer vehicle is fully loaded. The tail board 75 is then raised, as shown in FIG. 4, by actuation of the piston and cylinder mechanism 77 and the boom 76 is retracted. If desired, the skip 71 may be disconnected from the cables and left on the pile 73 of the material to be loaded ready to be used by the same trailer vehicle when it returns or by another trailer vehicle.

As shown in FIG. 3, the height of the tail pulley 78 can be raised until it lies close to the roof 79 of the mine. In FIG. 4 the boom 76 is shown in its lowered position.

FIGS. 5 and 6 illustrate the trailer vehicle 70 being unloaded on to a feeder 80 which feeds a conveyor 81. The trailer vehicle 70 is backed until the rear end of the trailer vehicle 70 lies above a hopper 82 which serves to guide material discharged from the trailer vehicle on to the feeder 80. When the trailer vehicle is in the position shown in FIG. 5 the inner transverse wall 83 is traversed rearwardly so as to discharge the load from the trailer vehicle into the hopper 82. The rearward position of the transverse wall 83 is shown in FIG. 6. The tail board 75 is hinged to the inner side walls 84 to which the inner transverse wall 83 is attached so that the tail board is moved out of the way of the load being discharged as the transverse wall 83 is rearwardly traversed.

As is seen in FIG. 4, the piston and cylinder device 77 operates a lever 85 to raise the tail board. In order to hold the tail board up as the inner wall 83 is traversed a pair of guide rails 86 are provided, as seen in FIGS. 5 and 6. These rails support the broad outer end of the tail board 75, which is trapezoidal in shape, as it is pushed rearwardly by the side walls 84.

FIG. 7 shows the manner in which a vehicle according to the invention can be utilized to advantage when working a gypsum or anhydrite mine. The mine is worked in a conventional manner leaving pillars 90 of gypsum or anhydrite to support the roof. Material blasted from a series of working faces such as 94a, 94b and 94c is carried by vehicles according to the invention to a loading point 95 where it is discharged on to the feed conveyor 80, feeding the conveyor belt 81. The track of a vehicle serving working face 94a is shown by arrows 96. When the vehicle is loaded it is driven to the feeding point 95 along the corridor 97. The vehicle is then backed on to the feeding point 95 for unloading and returns to the working faces 94a along the corridor 98. Similarly, vehicles serving the other working faces such as 94b and 94c can be loaded and unoladed, in each case the vehicle when loaded using the corridor 97 and when unloaded using the corridor 98. In this way there need be little interference between one vehicle and another. The conveyor belt 81 feeds an endless rope hauler 92 at tub-loading point 93. The hauler 92 carries the material out of the mine.

Although provision may be made for horizontally traversing the boom as in the embodiment of the trailer vehicle shown in FIG. 1, this is not essential since it is envisaged that a full load may be obtained for one position of the boom. When it is desired to take material from a different part of the pile blasted from the working face, it is a simple matter to move the position of the trailer vehicle.

In an alternative arrangement of the invention (not illustrated), the operation of the ropes hauling the skip is effected by hydraulic piston and cylinders together with a system of pulleys in order to magnify the movements obtained by the hydraulic pistons and cylinders.

Referring now to the embodiment illustrated in FIGS. 8 to 10, the vehicle therein is a trailer vehicle intended to be tractor drawn. The vehicle has a single pair of wheels 141 and 142 and a draw bar 143 for coupling to a tractor. The trailer vehicle has outer side walls 101 and 102 and an outer forward transverse wall 103. Telescopic booms 104 and 105 can be rearwardly extended from boom housings 106 and 107 disposed outside side walls 101 and 102 respectively. For this purpose double-acting hydraulic cylinders 116 are contained partially within the telescopic booms 104 and 105 and have their forward ends connected to the forward ends of the boom housings 106 and 107 whilst their pistons are connected by piston rods 117 to the telescopic booms 104, 105 towards their rear end. The boom housings 106 and 107 are pivoted to the trailer vehicle towards its rear end by pivots 108 carried on framework 109. The booms 104, 105 are interconnected at their rear ends by a cross bar 150 along which a pulley block 114 journalling the tail pulley 115 of a drag line loader is slidable by a hydraulic piston and cylinder device 151. Hydraulic cylinders 130 and 131 suspend the boom housings 106 and 107 from frameworks 132 and 133 mounted towards the forward end of the vehicle and serve for elevating the booms. A hydraulic cylinder 134 serves by a cable 135 to raise the tail board 120 to its position shown in FIG. 9.

When the tail board 120 is lowered, a skip 122 serves to drag the material to be loaded up the tail board 120 as described with reference to the previous embodiments. A cable 123 wound on a winch 124 serves to drag the skip 122 forward and a cable 125 wound on a winch 126 serves to drag the skip 122 rearward again. The cable 123 passes over a pulley 127 before being wound on the winch 124 whilst the cable 125 passes over the tail pulley 115 and a pulley 128 before being wound on the winch 126.

The vehicle has a longitudinally traversable transverse inner wall 136 which is shown in FIG. 8 in its forward position. In its forward position the inner wall 136 lies adjacent the outer forward transverse wall 103. The inner wall 136 is attached to inner side walls 137 and 138 which are rearwardly traversable with the transverse wall 136. For effecting traversing of the wall 136, double-acting hydraulic cylinders 139 arranged within suitable slots in the outer side walls 101 and 102 are attached to the forward end of the vehicle and have pistons attached by their piston rods to brackets 152 on the rearward end of the inner side walls 137 and 138.

Power for the hydraulic cylinders can be obtained directly from a hydraulic pump on a tractor drawing the vehicle or by a hydraulic pump arranged on the trailer vehicle itself. Such a pump may be separately driven or may be driven from the power take-off of the tractor. The winches 124 and 126 are driven through reduction gearing 140 from the power take-off of a tractor, but could also be hydraulically driven.

To load the trailer vehicle it is backed by its towing tractor into position adjacent the material to be loaded and the telescopic booms 104 and 105 are extended the desired amount. The hydraulic cylinders 130 and 131 are supplied with hydraulic fluid under pressure to lower the forward end of the boom housings 106 and 107 and thereby raise the tail pulley 115 close to the roof of the mine in which the vehicle is being operated. The tail board 120 is lowered and the trailer is then loaded with material from the heap of material, substantially as illustrated in FIG. 3 of the drawings. The tail pulley 115 can be moved somewhat to one side thereby enabling a different portion of the heap of material to be worked by appropriate operation of the hydraulic piston and cylinder device.

When the vehicle is fully loaded the telescopic booms 104 and 105 are retracted and the tail pulley 115 is lowered under gravity by releasing hydraulic fluid from the cylinders 130 and 131. The vehicle is then towed away to the unloading point by the tractor.

To unload the vehicle into a hopper or the like (not shown in the drawings), it is backed on to the hopper. The inner side walls 137, 138 and the inner front wall 136 are then rearwardly traversed by feeding hydraulic fluid to the appropriate end of the hydraulic cylinders 139 so as to push the load out of the vehicle into the hopper.

I claim:

1. In combination; a wheeled vehicle having a generally horizontal floor adapted to support a load of material to be transported; a tail board hinged to the rear end of said vehicle; means for progressively loading the vehicle, said loading means comprising a rearwardly extending boom on said vehicle, a tail pulley journalled to the rear end of said boom, a skip and winch means having a first cable attached to said skip for drawing said skip with material to be loaded up said tail board and on to said floor and a second cable passing over said tail pulley for drawing said skip rearwardly; and means comprising a rearwardly traversable transverse inner wall and hydraulic piston and cylinder means for rearwardly and forwardly traversing said inner wall for unloading the vehicle without tilting the floor.

2. The combination according to claim 1 further comprising means for adjusting the elevation of said boom and thereby the height of said tail pulley above the ground.

3. The combination according to claim 2 wherein said means for adjusting the elevation of said boom comprises hydraulic piston and cylinder means.

4. The combination according to claim 3 wherein said boom is hinged to said forward end of said vehicle and further comprising a cross beam at the rear end of said vehicle for supporting said boom, said hydraulic piston and cylinder means being associated with said cross beam for adjusting the elevation of said boom, and further hydraulic piston and cylinder means for traversing said boom along said cross beam laterally of the vehicle to enable the transverse position of said tail pulley to be adjusted.

5. The combination according to claim 3 wherein said boom is hinged to the forward end of said vehicle and in which said hydraulic means for adjusting the elevation of said boom is disposed obliquely at the rear of said vehicle between said vehicle and said boom.

6. The combination according to claim 1 wherein said boom is extensible and further comprising hydraulic piston and cylinder means for extending and retracting said boom.

7. The combination according to claim 5 wherein said boom is extensible and further comprising hydraulic piston and cylinder means for extending and retracting said boom.

8. The combination according to claim 1 further comprising hydraulic means for raising said tail board.

9. In combination; a trailer vehicle adapted to be tractor drawn and having a generally horizontal floor adapted to support a load of material to be carried; a tail board hinged to the rear end of said vehicle; means for progressively loading the vehicle, said loading means comprising a rearwardly evtending boom on said vehicle, a tail pulley journalled to the rear end of said boom, a skip and winch means having a first cable attached to said skip for drawing said skip with material to be loaded up said tail board and on to said floor and a second cable passing over said tail pulley for drawing said skip rearwardly; and means comprising a rearwardly traversable transverse inner wall and hydraulic piston and cylinder means for rearwardly and forwardly traversing said inner wall for unloading the vehicle without tilting the floor.

10. The combination according to claim 9 further comprising rotary coupling means coupling said winch means to a power take-off of a tractor.

11. The combination according to claim 9 wherein said winch means is hydraulically driven.

12. In combination; a wheeled vehicle having a generally horizontal floor adapted to support a load of material to be transported; a tail board hinged to the rear end of said vehicle; means for progressively loading the vehicle, said loading means comprising two rearwardly extending extensible booms one being disposed at each side of the vehicle, means connecting the rear ends of said booms, a tail pulley journalled to said connecting means, means for adjustably extending said booms, a skip and winch means having a first cable attached to said skip for drawing said skip with material to be loaded up said tail board and on to said floor and a second cable passing over said tail pulley for drawing said skip rearwardly; and means comprising a rearwardly traversable transverse inner wall and hydraulic piston and cylinder means for rearwardly and forwardly traversing said inner wall for unloading the vehicle without tilting the floor.

13. The combination according to claim 12 further comprising means for adjusting the elevation of said booms.

14. A trailer vehicle comprising in combination; a vehicle frame having a floor adapted to support a load of material to be transported, side walls and a front wall; a pair of wheels journalled to said vehicle frame; a draw bar connected to the forward end of said vehicle frame for attachment to a tractor; a tail board hinged to the rear end of said vehicle frame at the rearward end thereof; means for progressively loading the vehicle, said loading means comprising a rearwardly extending extensible boom pivoted to said vehicle frame, hydraulic piston and cylinder means for extending and retracting said boom, a tail pulley journalled at the rear end of said boom, hydraulic piston and cylinder means operative between said vehicle frame and said boom for adjusting the elevation of said boom thereby the height of said tail pulley above the ground, a skip, winch means mounted on the forward end of said vehicle frame, a first cable from said winch means to said skip for drawing material to be loaded up said tail board and onto the floor and a second cable from said winch means over said tail pulley to said skip for drawing said skip rearwardly; and means comprising a rearwardly traversable transverse inner wall and hydraulic piston and cylinder means for rearwardly and forwardly traversing said inner wall for unloading the vehicle without tilting the floor.

15. A trailer vehicle comprising in combination; a vehicle frame having a floor adapted to support a load of material to be transported, side walls and a front wall; a pair of wheels journalled to said vehicle frame; a draw bar connected to the forward end of said vehicle frame for attachment to a tractor; a tail board hinged to said vehicle frame at the rearward end thereof; means for progressively loading the vehicle, said loading means comprising a pair of rearwardly extending extensible booms pivoted to said vehicle frame, means interconnecting the rearward ends of said booms, a tail pulley journalled on said interconnecting means, hydraulic piston and cylinder means for extending and retracting said booms and for adjusting the transverse position of said tail pulley, hydraulic piston and cylinder means effective between said vehicle frame and said booms for adjusting the elevation of said boom and thereby the height of said tail pulley above the ground, a skip, winch means mounted on the forward end of said vehicle frame, a first cable from said winch means to said skip for drawing material to be loaded up said tail board, and onto said floor, and a second cable from said winch means over said tail pulley to said skip for drawing said skip rearwardly; and means for unloading the vehicle without tilting the floor.

References Cited in the file of this patent
UNITED STATES PATENTS

| 2,268,568 | Cook | Jan. 6, 1942 |
| 2,698,096 | Hughes | Dec. 28, 1954 |
| 2,746,612 | Wirz | May 22, 1956 |
| 2,814,401 | Mendez | Nov. 26, 1957 |
| 2,889,944 | Clark et al. | June 9, 1959 |

FOREIGN PATENTS

| 739,244 | France | Oct. 26, 1932 |